United States Patent
Jabusch et al.

(10) Patent No.: US 7,686,243 B2
(45) Date of Patent: Mar. 30, 2010

(54) SELF-LOCKING SEAT BELT RETRACTOR

(75) Inventors: Ronald Jabusch, Elmshorn (DE);
Volkmar Heine, Hamburg (DE)

(73) Assignee: Autoliv Development AB, Vargarda (SE)

( * ) Notice: Subject to any disclaimer, the term of this patent is extended or adjusted under 35 U.S.C. 154(b) by 728 days.

(21) Appl. No.: 10/573,391

(22) PCT Filed: Sep. 2, 2004

(86) PCT No.: PCT/EP2004/009767

§ 371 (c)(1), (2), (4) Date: Dec. 6, 2006

(87) PCT Pub. No.: WO2005/037617

PCT Pub. Date: Apr. 28, 2005

(65) Prior Publication Data

US 2007/0200022 A1 Aug. 30, 2007

(30) Foreign Application Priority Data

Sep. 25, 2003 (DE) ................................ 103 44 435

(51) Int. Cl.
*B60R 22/28* (2006.01)
*B60R 22/36* (2006.01)
*F16B 1/00* (2006.01)
(52) U.S. Cl. .................................... 242/379.1; 403/372
(58) Field of Classification Search ................. 242/376, 242/379.1, 382, 382.1, 383, 384, 407, 407.1; 403/317, 319, 372; 411/438, 527, 517, 521, 411/528
See application file for complete search history.

(56) References Cited

U.S. PATENT DOCUMENTS

| | | | | | |
|---|---|---|---|---|---|
| 2,950,937 | A | * | 8/1960 | Bedford, Jr. | 403/372 |
| 3,007,726 | A | * | 11/1961 | Parkin | 403/372 |
| 3,033,622 | A | * | 5/1962 | Renner | 384/537 |
| 3,779,659 | A | * | 12/1973 | Habert | 403/372 |
| 3,837,687 | A | * | 9/1974 | Leonard | 285/111 |
| 4,165,194 | A | * | 8/1979 | Flower | 403/320 |

(Continued)

FOREIGN PATENT DOCUMENTS

DE 200 15 402 U1 2/2001

(Continued)

*Primary Examiner*—John Q Nguyen
*Assistant Examiner*—Scott Haugland
(74) *Attorney, Agent, or Firm*—Brinks Hofer Gilson & Lione

(57) ABSTRACT

A self-locking belt retainer with a vehicle-sensitive and/or seatbelt-sensitive actuatable locking device for the belt spool shaft, with a profile head as carrier of a locking element arranged so as to be movable with the retractor housing for locking of the belt spool shaft. A force limiting device in the form of a torsion bar is connected at its one end with the belt spool shaft and at its other end with the profile head is At least one axially projecting projection (14) is provided on the one of the components which are joined to one another (10,11), which engages in at least one recess formed on the front side of the other component (10,11) and that in the annular space formed between the projection (14) and the inner walls (21) of the recess (20), a clamping ring (16,17,18) is located between projection (14) and inner walls (21) of recess (20).

7 Claims, 1 Drawing Sheet

U.S. PATENT DOCUMENTS

| | | | | |
|---|---|---|---|---|
| 4,886,481 A | * | 12/1989 | Gutfleisch et al. | 464/162 |
| 5,110,246 A | * | 5/1992 | Fisher et al. | 411/429 |
| 5,603,530 A | * | 2/1997 | Guest | 285/105 |
| 6,354,528 B1 | * | 3/2002 | Nagata et al. | 242/374 |

FOREIGN PATENT DOCUMENTS

| | | |
|---|---|---|
| DE | 196 81 341 C1 | 8/2002 |
| DE | 101 22 910 A1 | 11/2002 |

* cited by examiner

SELF-LOCKING SEAT BELT RETRACTOR

CROSS REFERENCE TO RELATED APPLICATIONS

This application claims priority to German patent application number 103 44 435.1, filed Sep. 25, 2003 and PCT/EP2004/009767, filed Sep. 2, 2004.

FIELD OF THE INVENTION

The invention relates to a self-locking seat belt retractor with a vehicle-sensitive and/or belt strap sensitive actuatable blocking device for the belt spool. The retractor spool includes a profile head as a carrier of a locking member for locking of the belt spool shaft which is arranged so as to be movable in relation to the retractor housing 40 (schematically shown in FIG. 1 for illustrative purposes only) and with a force limiting device in the form of a torsion bar which is connected at its one end with the belt spool shaft and at its other end with the profile head.

BACKGROUND OF THE INVENTION

A belt retractor with the above characteristics is described in DE 196 81 341 C1. Since it is necessary to couple the belt spool shaft and the profile head during normal winding up and out, and also during normal belt locking, two shear pins are arranged on the side of the belt spool shaft which faces the profile head, which engage with corresponding apertures in the profile head and which are riveted to the profile head during assembly, so that belt spool shaft and profile head are held together as one assembly. If a great tensile force is exerted on the belt in the direction in which the belt is pulled out following locking of the belt shaft initiated by the belt/strap/sensitive or vehicle/sensitive control system, for example because of a vehicle collision, the shear pins break off, and the belt spool shaft can afterwards be rotated relative to the locked profile head in the direction in which the belt is being pulled. This relative rotation is taken up by the torsion bar which comes into play between the belt spool shaft and profile head, which provides the desired force limitation based on the torsional deflection of the torsion bar.

The known belt roller is associated with the disadvantage that manufacture of the shear pin connection is costly and time-intensive, because the shear pins which engage in the recesses of the profile head are riveted to the profile head, whereby and high demands are placed on the precision of the connection and fit of these components. The force peak which occurs as a result of the shearing off of the shear pins immediately before the force limitation takes effect is difficult to define or to set, and finally, following shearing of the shear pins, axial forces are no longer restrained, whereby the torsion bar elongates in the axial direction when subject to torque due to plastic deformation and drives belt spool shaft and profile head axially apart, which is not desirable.

An object of this invention is to improve the connection between belt spool shaft and profile head in a self-locking belt roller of the type previously described with regard to its manufacture and function.

SUMMARY OF THE INVENTION

The basic concept on which this invention is based provides that at least one projection which is located on one of the retractor components connected with one another and which projects in axial direction engages in at least one recess provided in the front side of the other component, and that a clamping ring is located in the annular space formed between the projection and the inner walls of the recess and clamps between the projection and the inner walls of the recess.

One advantage associated with the invention is that during assembly of belt spool shaft and profile head into the desired spool subassembly, it is only necessary to put the spool belt shaft, clamping ring and profile head together, whereby clamping of the belt spool shaft and profile head takes place by means of the assembly process and the axial force which can be transferred is greater than the joining force which has to be applied during assembly. Connection of the belt spool shaft and profile head takes place above the torsion bar. However, the provision of the clamping ring also means that the force peak which occurs because of coupling of the belt spool shaft and profile head using shear pins as described in the state of the art no longer takes place and the force limiting system reacts more gradually, whereby it may occur that an additional force limiting level is also created by means of the clamping ring in the course of belt force limitation. A further advantage of this invention consists in the fact that the -connection by means of the clamping ring also transfers axial forces during force limitation, so that any elongation of the torsion bar no longer has the disadvantages described above.

According to an embodiment of the invention, it is intended that the clamping ring can be pushed onto the projection and that the external diameter of the clamping ring is larger than the internal diameter of the recess.

In order to make assembly of the spool subassembly simpler, according to one embodiment of the invention, the protection can be provided on its front side with a step for accommodation of the clamping ring. This means that the clamping ring is pre-fixed on the projection of the profile head, so that the subassembly which has been pre-assembled to this extent is more easily handled during final assembly of the belt spool. Furthermore, the clamping ring cannot escape while the clamping ring is being pushed into the allocated recess, but remains fixed fixed in position.

Alternatively it can be provided that the clamping ring can be laid into the recess and that the internal diameter of the clamping ring is smaller than the diameter of the projection.

A described embodiment of the invention provides that the clamping ring is in the form of a flat disc, further embodiments can provide for the clamping ring being in the form of a closed ring or alternatively as an open ring exhibiting a gap.

According to one embodiment of the invention, it is also useful to form the clamping ring as a spiral, as this spiral form has the advantage that based on the relative rotation of belt spool shaft and profile head during force limitation, the clamping ring can create a return force in the same way as a thread and works contrary to the axial displacement of the belt shaft in relation to the profile head which has already been discussed.

DESCRIPTION OF THE DRAWINGS

Embodiments of the invention are shown in the drawings, which are described below.

The drawings are as follows.

DETAILED DESCRIPTION OF THE INVENTION

Figure 1:
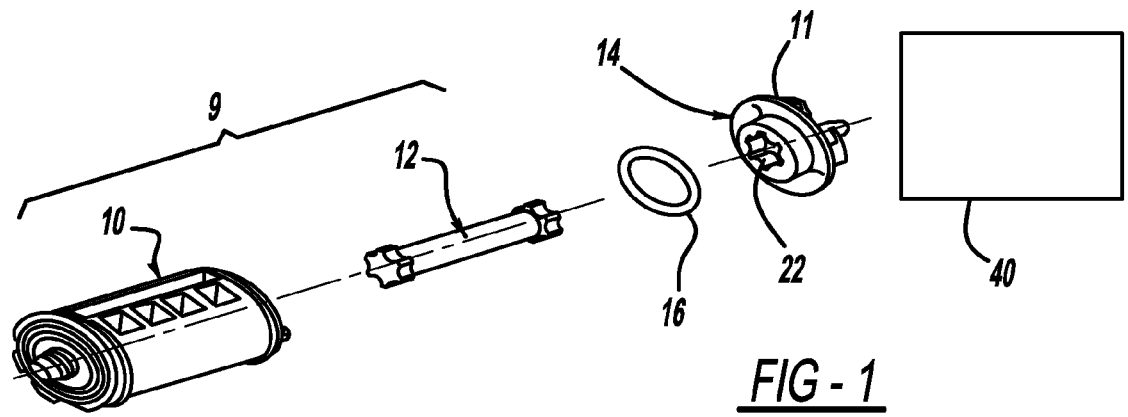
FIG. 1. illustrates a spool subassembly consisting of belt spool shaft and profile head as a component of a self-locking belt retractor in an overall view.

In so far as the object of the invention is a self-locking belt roller, an overall view of the object can be found in DE 196 81 341 C1 which is incorporated herein by reference, on which the generic description of the object of the invention is based. As only the spool subassembly 9 consisting of belt spool shaft and profile head is necessary for understanding of the present invention, in FIG. 1 the belt spool shaft is designated by reference number 10 and a profile head to be coupled to the belt shaft is designated by 11. Belt spool shaft 10 and profile head 11 are coupled by means of a torsion bar 12, whereby torsion bar 12 is linked torsionally with belt spool shaft 10 with its left end shown in FIG. 1 and with its right end shown in FIG. 1 is connected in a torque transferring manner with profile head 11, for which purpose profile head 11 exhibits an accommodation opening 22 which is formed to as to correspond to the end of torsion bar 12. Profile head 11 extends with an axial projection 14 starting from the profile head which forms accommodating opening. Axial projection 14 fits into a recess 20 (FIG. 2) of belt spool shaft 10. Joining of belt spool shaft 10 and profile head 11 occurs by adding a clamping ring 16, which will be explained further below.

Figure 2:
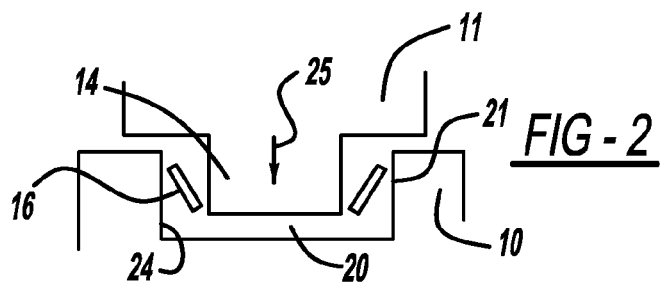
FIG. 2 is a partial schematic view of the components of the belt retractor during the joining process.
Figure 3:
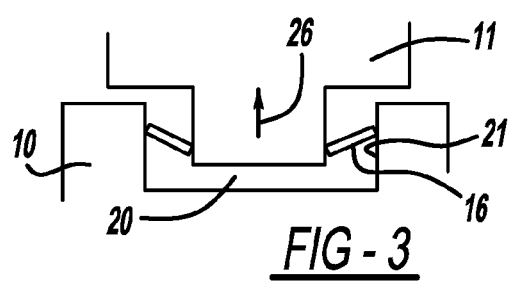
FIG. 3 is a view similar to of FIG. 2 during axial loading.
Figure 3A:
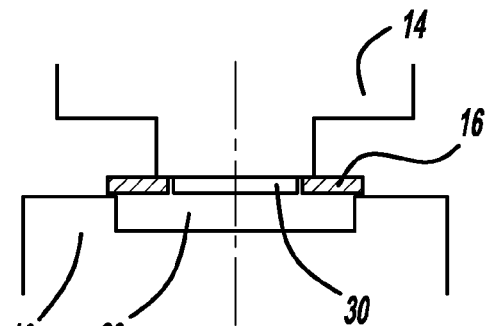
FIG. 3a shows a design similar to those shown by FIG. 2 or 3 of a different embodiment before assembly.
Figure 6:
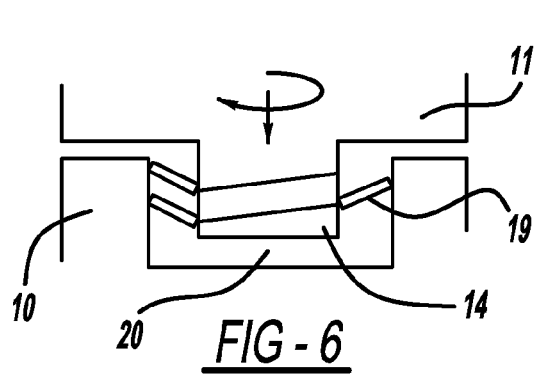
FIG. 6 shows a design similar to that of FIG. 2 with a clamping ring subject to further variation.

Fixing of projection 14 of profile head 11 into recess 20 of belt shaft 10 is shown diagrammatically in FIGS. 2, 3 and 6. This is achieved by inserting a clamping ring 16 into the annular space 15 formed between projection 14 and inner walls 21 of recess 20. In FIGS. 2 and 3 there is only a schematic representation of how clamping ring 16 behaves during assembly in the insertion direction (Arrow 25), and how when pulled in the opposite direction (Arrow 26), clamping ring 16 positions itself and clamps between projection 14 and inner walls 21 of recess 20 and prevents projection 14 of profile head 11 from slipping out of recess 20 of belt spool shaft 10. Such loading in the pull direction (Arrow 26) can for example occur during handling of the subassembly 9 consisting of belt spool shaft 10 and profile head 11 during further assembly steps of the belt retainer or also during force limitation operation. In FIG. 3a, an embodiment is shown in which projection 14 of profile head 11 is additionally provided with a pilot projection or step 30 on the front side, onto which clamping ring 16 is placed. This means that clamping ring 16 is fixed in advance to projection 14 for final assembly of the belt retractor.

Figure 4:
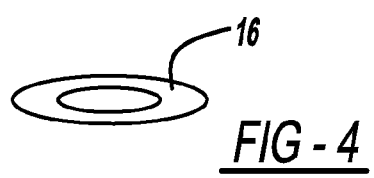
FIG. 4 is an individual view of a clamping ring.
Figure 5:
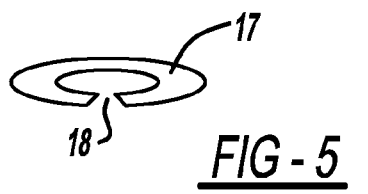
FIG. 5 shows the clamping ring according to FIG. 4 in a different embodiment.

As can be seen from FIGS. 4 and 5, the clamping ring 16 can be designed as a closed clamping ring 16 in the form of a flat disc, or as a flat disc open clamping ring 17 which exhibits a gap 18.

As can finally be seen with reference to FIG. 6, a clamping ring 19 in a further embodiment can exhibit a spiral form, so that during the relative movement of belt spool shaft 10 and profile head 11 which occurs during force limitation, the clamping ring creates a return force in axial direction in the same way as a thread.

Instead of the form described in the embodiment, alternatively a step could be formed on the front side of the belt spool shaft 10 which engages in a corresponding ring-shaped recess of profile head 11.

The characteristics of the object of these documents which are described in the above description, the patent claims, the summary and the drawing can be of fundamental significance for the realisation of the invention in its various embodiments both individually and in any desired combinations with each other.

It is within the scope of this invention to form axial projection 14 from belt spool shaft 10, with the recess 20 being formed by profile head 11.

Clamping rings 16, 17, and 19 have a radial extent such that they engage both the axial projection 14 and inner wall 21 of the recess 20. Due to the deflection of rings 16, 17, and 19 as they are forced into annular space 15, they frictionally engage both of the components defining the annular gap. This engagement allows torque to be transferred between the parts, limited by the frictional engagement of the clamping rings 16, 17, and 19. This engagement also has the effect of mounting belt spool shaft 10 and profile head 11 in an assembled state, and allows limited axial forces to be transferred between the components.

While the above description constitutes the preferred embodiment of the present invention, it will be appreciated that the invention is susceptible to modification, variation, and change without departing from the proper scope and fair meaning of the accompanying claims.

The invention claimed is:

1. A spool assembly for a self-locking belt retractor comprising a locking device for a belt spool shaft, a profile head as carrier of a locking element arranged so as to be movable in a housing for locking of the belt spool shaft, a force limiting device in the form of a torsion bar which is connected at one end with the belt spool shaft and at an opposite end connected with the profile head, at least one axially extending projection formed by one of the belt spool shaft or the profile head which fits into a recess formed on the other of the belt spool shaft or the profile head forming an annular space therebetween and a clamping ring positioned in the annular space for transmitting limited torque between the belt spool shaft and the profile head and retaining them in an assembled condition, wherein the clamping ring in an unassembled condition has a first outer diameter that is larger than a first internal diameter of the recess and a second internal diameter that is smaller than a second outer diameter of the projection, and the clamping ring can be pushed onto the projection about the second outer diameter and laid in the recess along the first internal diameter so as to deflect the clamping ring to the assembled condition where the clamping ring frictionally engages both the projection and an inner wall of the recess.

2. A spool subassembly according to claim 1, wherein the projection is provided on a front side of the one of the belt spool shaft or the profile head with a step for accommodation of the clamping ring.

3. A spool subassembly according to claim 1 wherein the clamping ring in the unassembled condition is in the form of a flat disc.

4. A spool subassembly according to claim 1 wherein the clamping ring is formed as a closed ring.

5. A spool subassembly according to claim 1 wherein the clamping ring is in the form of an open ring forming a gap.

6. A spool subassembly according to claim 1 wherein the clamping ring has a spiral form.

7. A spool subassembly according to claim 1 wherein the clamping ring in the assembled condition is disposed immediately adjacent to an axial end of the projection.

* * * * *